Sept. 18, 1945.  A. D. HANSSON  2,384,997
BRAKING DEVICE FOR AIRPLANES
Filed Aug. 3, 1944  4 Sheets-Sheet 1
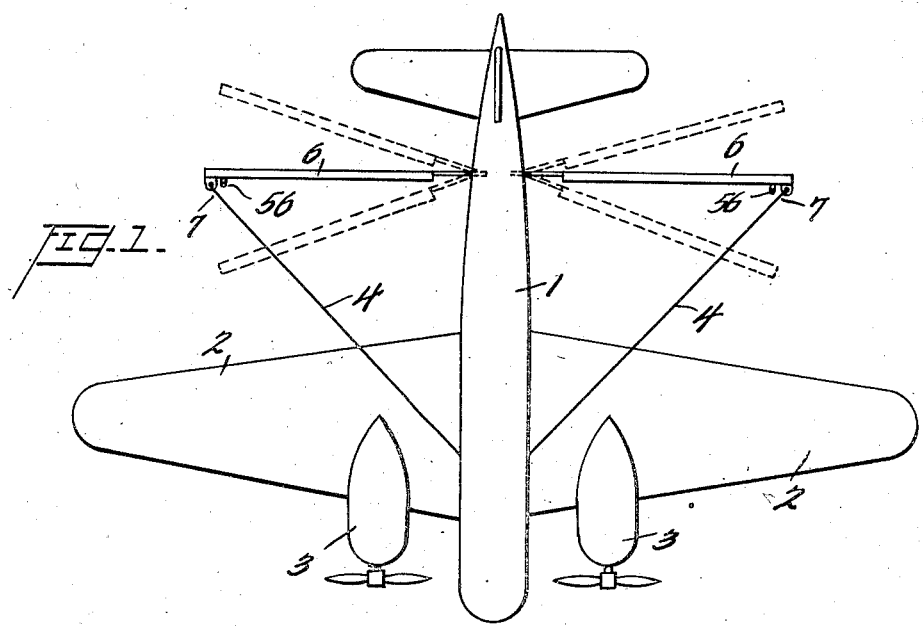
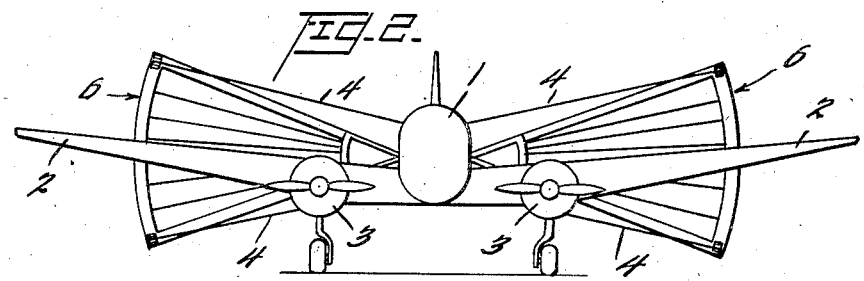
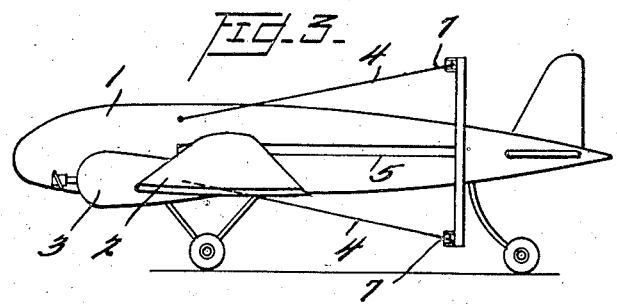
Inventor
Arthur D. Hansson,
By Parker Cook
Attorney

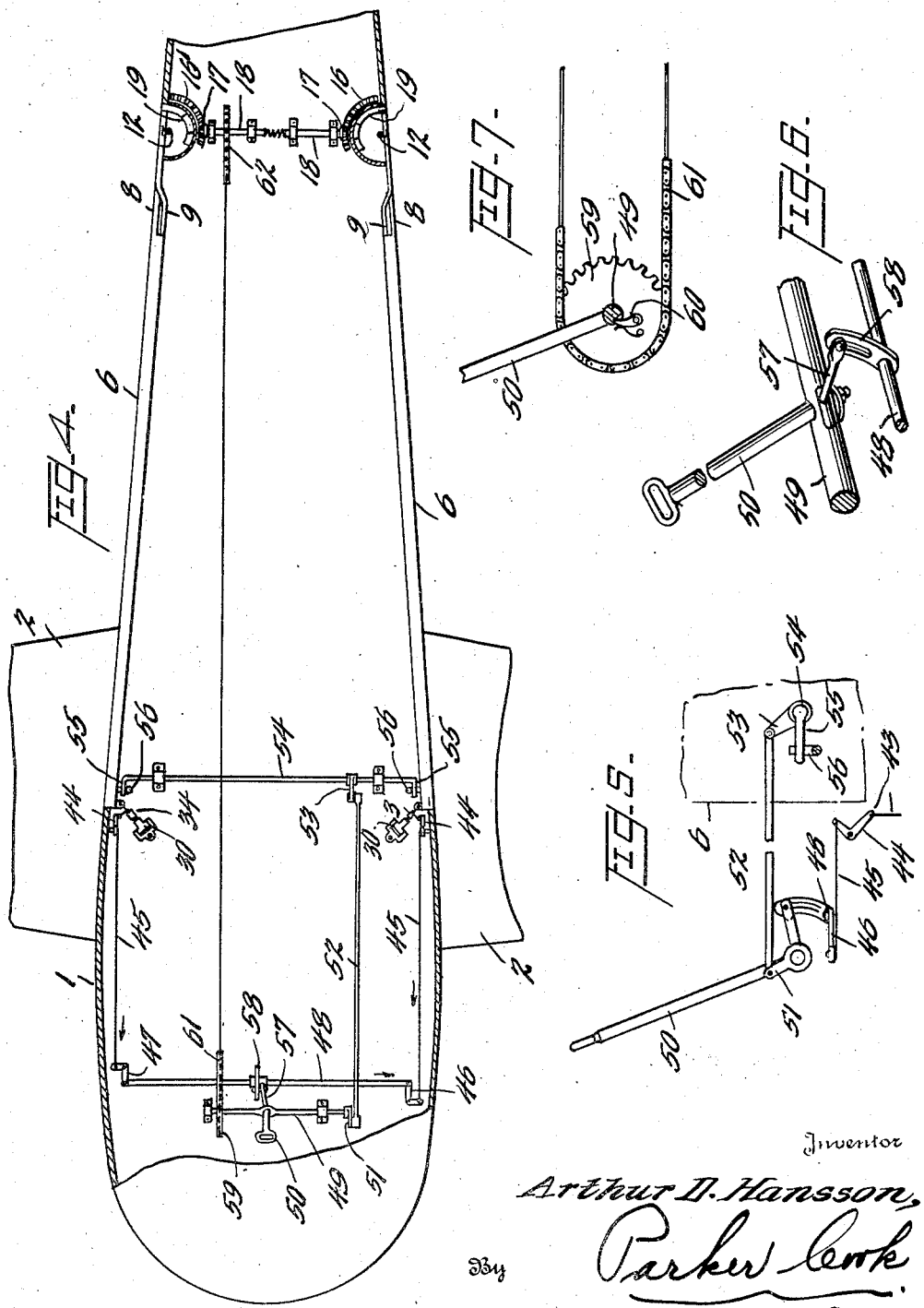

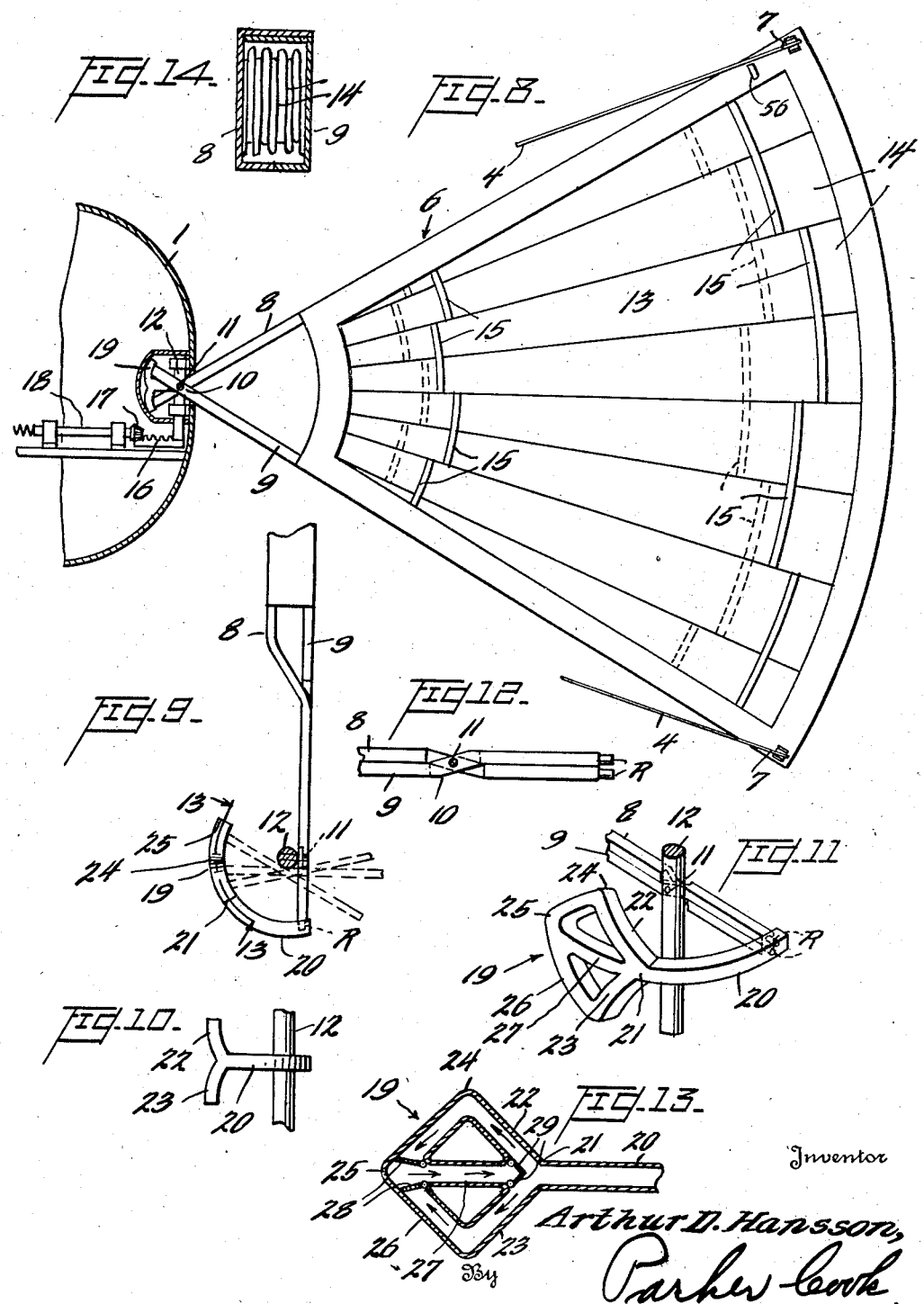

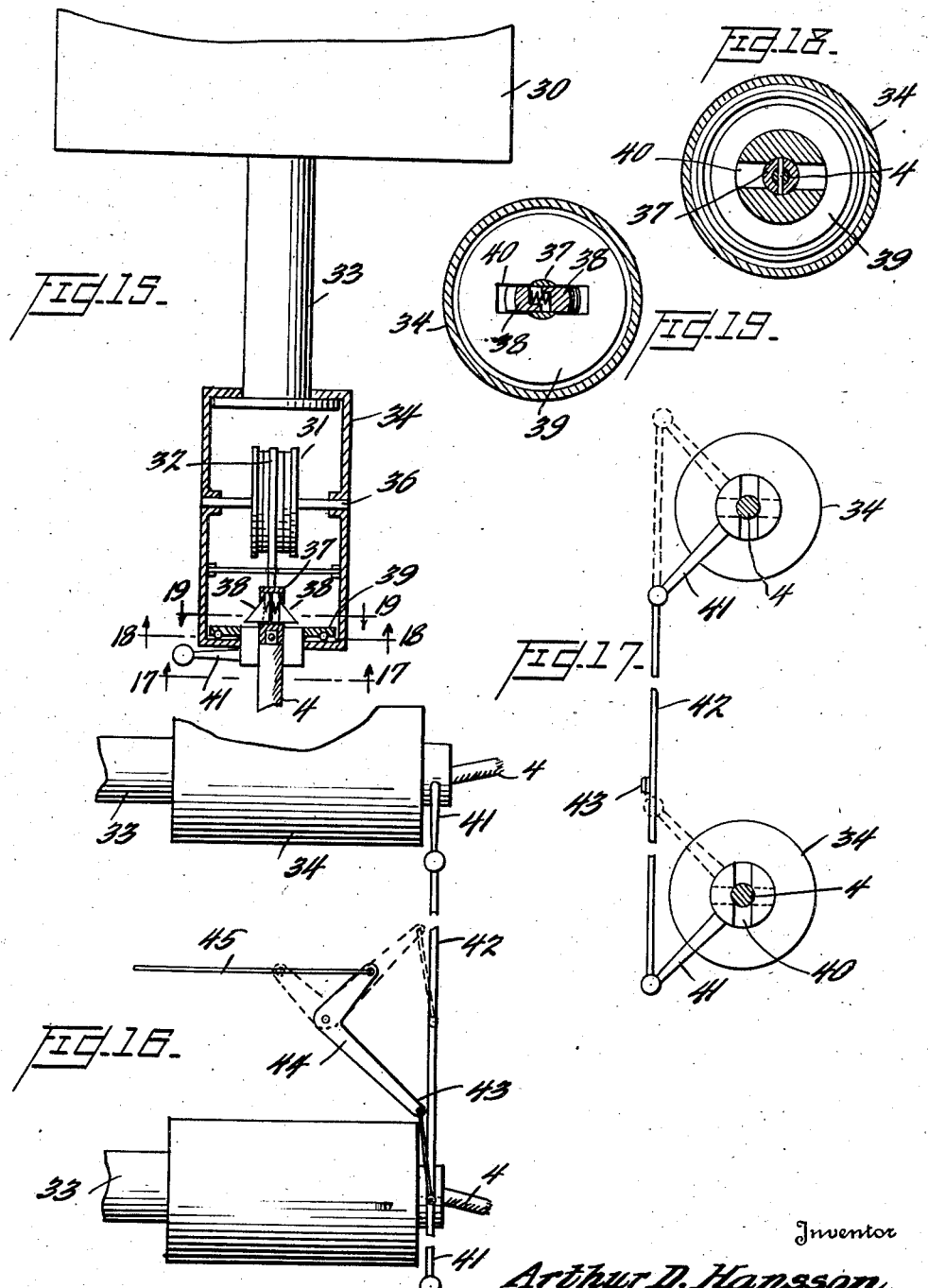

Patented Sept. 18, 1945

2,384,997

UNITED STATES PATENT OFFICE 2,384,997

BRAKING DEVICE FOR AIRPLANES

Arthur David Hansson, Shrewsbury, N. J.

Application August 3, 1944, Serial No. 547,850

11 Claims. (Cl. 244—113)

My invention relates to a new and useful improvement in braking devices for airplanes and is of the same general type as that shown in the patent issued to me on April 11, 1944, and numbered 2,346,255.

In the patent above mentioned, the brake consisted of two spaced drags, which drags were in the form of oppositely positioned lobe-shaped parachutes which were to be released by the operator in an emergency or forced landing, so that the airplane may be stopped in a far quicker time than is generally possible.

The present invention also consists of two oppositely positioned air drags that are to be released by the operator, but rather than have these drags in the form of lobe-shaped parachutes, they are in the form of relatively large fans that extend at right angles to the wind stream when they are released and spread.

Still another object of the invention is to provide a breaking device or air drag for airplanes wherein arms of fanlike construction are housed in the fuselage and extend longitudinally of the fuselage until such time as they are released by the operator, at which time they swing out at right angles to the fuselage and spread, and after reaching a position at right angles to the fuselage they are operated to allow a rearward and closing movement. They then remain in this position until the airplane alights, after which they may be retracted and again positioned in the fuselage until such time as it will be necessary to release them as landing brakes.

Still another object of the invention is to provide a smooth working air drag for airplanes wherein the two fan-shaped drags are foldably arranged so that the canvas or other desired material is folded or packed when the arms are not in use to thus occupy as little space as possible.

Still another object of the invention is to provide a braking device for airplanes wherein the inner ends of the crossed arms of the fan are mounted in specially constructed substantially hemispherical sockets, so that after the brakes or air drags are released from their longitudinal position and approach the perpendicular, they will be automatically spread or opened, after which they are allowed to fold or close as the drags containue their movement and swing back to an angle beyond the perpendicular.

Still another object of the invention is to provide two fanlike drags that will automatically spread when released by the operator, the inner ends of the arms of the fans following certain channels in a socket in which the inner ends are mounted; these sockets guiding the fans in their spreading and closing movement and also allowing the fans to be closed after they have performed their function to allow the fans to be returned to their original housing in the fuselage.

Still another object of the invention is to provide an air brake for airplanes wherein two fan-shaped like arms will be allowed to swing to a right angular position to the wind stream and be assisted in their opening and spreading movement by certain sockets in which the inner ends of the arms are mounted. Then after reaching a position at right angles to the longitudinal axis of the fuselage, they will be released to swing still farther rearwardly but at a slower rate of speed and close as they reach their rearwardmost position.

Still another object of the invention is to provide two fanlike-shaped air drags that may be housed in the fuselage when not in use and quickly and readily simultaneously opened in case of necessity by the operator and then closed by a twist of the wrist. After the plane is grounded, the pilot or operator may then retract the air drags so that they will be packed and folded in their original operative position.

With these and other objects in view the invention consists in certain new and novel arrangements and combination of parts as will be hereinafter more fully described and pointed out in the claims.

In the drawings:

Fig. 1 is a top plan view of an airplane showing in full lines the air drags extending at right angles to the air stream, the dotted lines showing the drags as they approach this position, and in their final closed (not spread) position;

Fig. 2 is a front end view and showing the fans spread and extending at right angles to the air stream;

Fig. 3 is a side elevation of the plane showing the air drags extending at right angles to the longitudinal central axis of the fuselage;

Fig. 4 is a fragmentary top plan of the fuselage with parts being broken away to show the control mechanism for the fan-shaped air drags;

Fig. 5 is a fragmentary detail view of the control lever;

Fig. 6 is a fragmentary perspective of the same;

Fig. 7 is a fragmentary detail view showing how the fans may be ratcheted to their closed position;

Fig. 8 is a fragmentary detail of one of the fan-shaped air drags, the fan being shown in its spread position, parts of the fuselage broken away to show the manner in which the inner ends of the crossed arms of the fan are mounted;

Fig. 9 is a view showing fragmentary portion of the inner ends of a fan arm, the dotted lines showing the different positions the inner ends of the arms will assume on an operation of the air drag;

Fig. 10 is a fragmentary view at right angles to Fig. 9;

Fig. 11 is a developed fragmentary view of the position of the channels formed on the inner surface of the substantially hemispherical socket;

Fig. 12 is a fragmentary detail showing how the arms of the fan are crossed at the inner ends;

Fig. 13 is a developed or partly schematic sectional view showing the channels on the inner surface of the domed or hemispherical socket and the gates for allowing the inner arms to be retracted through the center channel when the arms are to be repacked into the fuselage;

Fig. 14 is a small fragmentary detail sectional view showing the fans or air drags in their folded or packed condition;

Fig. 15 is a fragmentary detail sectional view of a shock absorber, take-up spool and re-wind wheel;

Fig. 16 shows the control mechanism for the re-wind spool and its associated parts;

Fig. 17 is an end view of the same;

Fig. 18 is a horizontal sectional view taken on line 18—18 of Fig. 15; and

Fig. 19 is a sectional view taken on lines 19—19 of Fig. 15.

At the outset it is to be understood that only that much of an airplane is shown as thought necessary to understand the present invention. Furthermore, part of the mechanism is diagrammatical in nature and various means from that shown may be used to control the opening and closing of the fan brakes which latter form the gist of the present invention.

Referring now more particularly to the several views and for the moment to Figs. 1, 2, and 3 there may be seen a conventional type of airplane with the fuselage 1 and the wings 2 with their housed engines 3. Also there may be seen in Figs. 1 and 2 the drag lines 4 which are fastened at their forward end to shock absorbers shortly to be described, which are fastened at points lying in a plane which passes through the center of gravity of the airplane, so that when the brakes are released it will not affect the stability of the airplane.

As also may be seen in Fig. 3 there is a longitudinally extending slot or opening 5 on each side of the fuselage in which the respective fan-shaped air drags or brakes 6 are to be housed for instant release.

The rear ends 7 of the drag lines 4 are secured to the outer ends of their respective fans or drags 6 as may also be seen in Fig. 8.

As the fans or air drags are alike but oppositely positioned, a description of the one will be a description of both.

Referring now to Fig. 8, there will be seen the two arms 8 and 9 that form the framework of the fan or air drag 6. These arms cross as at 10 and are pivotally mounted as at 11 to the upright spindle 12 that is mounted in the side of the fuselage 1.

Over these arms 8 and 9 is provided a covering 13 which may be of heavy duck or canvas and it is divided into a number of foldable segments 14 which segments decrease in width, it will be noticed, as they approach the inner ends of the arms 8 and 9.

There will also be seen a plurality of elastic strips 15 which are stretched as the fan is opened as shown in Fig. 8, so that after the fan is released from its right angular position after opening and is then allowed to swing rearwardly from the right angular position in the wind stream, these rubber strips will close the fan or, in other words, pull the outer ends of the arms 8 and 9 towards each other. As shortly to be mentioned, the inner ends of the arms 8 and 9 follow certain channels in a substantially hemispherical socket so that the arms will be guided in both their opening and closing movement through the inner ends of the fan and these channels in the hemispherical socket.

Before describing the inner ends of these arms 8 and 9 reference is made to Fig. 4. It will be remembered that the spindle 12 is mounted in a vertical position as shown in Fig. 11 and the lower end of this spindle is located at the center or focal point of a semi-circular rack or segment 16 which rack meshes with the pinion 17 on the shaft 18. This shaft extends across from the one rack 16 to a similar rack 16' so that when one of the air drags 6 swings outwardly from its housed position to the right angular position shown in full lines in Fig. 1, the opposite arm will move in unison with it due to the fact that the rotative movement of the rack 16 from the one arm 6 will be transmitted to the like rack and the oppositely positioned arm.

Thus there is no possibility of one of the air drags 6 opening faster than the other which, of course, would affect the stability of the plane.

This opening in unison of the two arms follows the same principle as illustrated in my previous patent above mentioned, to wit: 2,346,255.

Referring now to the socket 19 which I have termed a hemispherical socket, it will be understood that the bottom of the socket is provided with an internal entrance channel 20 the path of which has been developed in Fig. 11 to show the path of movement of the inner ends of the arms 8 and 9 as the fan-shaped air brake 6 is released into the wind stream. This channel 20 diverges as at 21 to form the upwardly extending channel 22 and the downwardly extending channel 23. The upward channel 22 after it reaches its zenith 24 again descends to the far point 25 and likewise the lower channel ascends as seen at 26 until it again merges at the point 25 of the other channel.

Still referring to Fig. 11 there may be seen in dotted lines the two small rollers R which are respectively fastened at the inner ends of the arms or framework 8 and 9 of the air drag 6, and it will be understood that as the spindle 12 is rotated, the rollers R will be guided in their rotative movement in the channel to the point 21 at which time the inner end of the arm 9 will pass into the channel 22 (it being remembered that the arms 8 and 9 are crossed) and as the inner end of the arm 9 raises, its outer end will descend or lower. In the same way the other roller R will pass into the channel 23, and when the arms 8 and 9 are in this position, the air brake drag 6 will be in the position shown in Fig. 8, that is, the fan will be opened to its fullest extent, and the inner ends of the framework arms 8 and 9 will be spread as also shown in Fig. 8.

After the fan-shaped arm 6 is fully opened, it may be released, as will be later explained, and as it swings from a right angular position, as shown in full lines in Fig. 1, rearwardly to the dotted line position, these rollers R will respectively pass one downwardly and one upwardly till they meet again at the point 25, at which point the fan will again be closed as the inner ends of the arms will be together and, so will, of course, the outer ends.

When it is desirable to rehouse the fan, rather than having the fan spread again on the retracting movement, there is provided the central return channel 27 which registers with the entrance channel 20 that may also be seen in Figs. 11 and 13.

It will be noticed that I have provided two stop gates 28 near the point 25, so that after the rollers R have reached the point 25 and the inner ends of the arms are again together, on a forward movement of the fan these rollers R will now pass through the central channel 27 and into the channel 20 to again reach the position as shown in Fig. 11.

Thus as the fan-shaped drag is folded after having performed its function, it is not necessary to spread the fan, but it may be swung forward and into its slot 5 in the fuselage.

There are also provided the small forward swinging gates 29 at the point 21 where the channels diverge so that there is no possibility of the fan not opening when released from its housing.

As heretofore mentioned, this arrangement is carried out on the opposite sides of the plane so that the opening and closing of the two fans will be in unison, and it will be remembered that I have previously described how the rearward movement of the fans is also in unison.

Therefore, I have the fans moving from their closed position to right angles in the wind stream in unison, and also opening, that is the fans spreading in unison.

Therefore, there can be no greater resistance created by one air drag than the other.

Also as heretofore mentioned, the elastic bands forming a part of the fan will close the fan from its spread position; and the sockets with their channels will accurately guide the arms 8 and 9 as they swing from their longitudinal position to their right angular position and also guide the spreading and closing of the respective fans throughout this movement and through a continued movement after the fans have been released from their right angular position to reach their swung-back position.

Having explained how the two fan-shaped drags swing rearwardly from their housed position to a right angular position and how the fan-shaped drags spread while opening, and having also explained how the fans again fold as they swing back to their farthermost position, reference will now be made to the take-up spools and shock absorbers to which the forward ends of the drag lines 4 are attached.

Referring, therefore, for the moment to Figs. 4 and 15, it will be understood there are two oppositely positioned pairs of shock absorbers 30 with their take-up spools 31; and the forward ends of the drag lines 4, it will be understood, are connected with their respective cables or steel ribbons 32 as will shortly be explained.

Referring now to Fig. 15, the shock absorber 30 is diagrammatically shown from which will extend the piston rod 33. Any form of shock absorber may be used and the one above mentioned is illustrative only.

However, at the end of the piston rod 33, there is shown a housing 34 in which there is a spring-return spool 31 mounted on its hub 36. Here again this spool is shown merely in an illustrative manner.

Wound around the spool 31 is the heretofore-mentioned steel ribbon or cable and to the end thereof is secured a small head 37 provided with slots through which extend the spring-pressed ears 38. These spring-pressed ears are preferably triangular in shape with their bases extending in a horizontal position as shown.

Just below these ears 38 is a revolvable plate 39 provided with elongated opening 40 which will permit these ears to pass through the slot when the slot is in alignment with said ears.

Also connected to the lower end of the head 37 is the end of the drag line 4. Thus it will be understood that when the elongated slot 40 is in registry with the ears 38, the head 37 with its ears 38 may pass through the elongated slot 40 and the ribbon 32 will unwind from the take-up spool 31, and thus a lengthening of the drag line 4 will permit the air drag 6 to swing rearwardly as shown in the dotted line position in Fig. 1. It will be remembered that this rearward movement from the perpendicular causes the spread fans to collapse or close.

It is also to be remembered that there is a pair of shock absorbers and take-up spool for each of the air drags 6, and these are to be operated in unison as will be shortly described.

When the air drags 6 are being returned to their initial housed position in the fuselage, the take-up spool will return the drag lines 4 to the position shown in Fig. 15, and the ears will be compressed so that the head with its ears will pass through the central opening in the plate.

However, the head will not be able to pass out through the slot 40 until the revolvable plate 39 is turned, as will be shortly described.

Thus it will be seen that when the air drags 6 are liberated from the housing, they will swing to a right angular position and spread as they reach their right angular position, the shock of the opening being transmitted from the drag lines 4 to the shock absorbers, and at this point revolvable plates 39 may be operated to allow the steel cable on the take-up spools to allow the air brakes to move farther backwardly. Then on a returning of the brakes to the fuselage, the take-up spools will bring the drag lines back to their normal position with respect to the housing and the shock absorbers.

These revolvable plates 39 are each provided with a lever 41 which lever is connected to a bar 42, and the bar 42 is connected to one end 43 of the bell-crank lever 44 (see Fig. 16) from which extends the cable 45. Therefore, from each of these rotatable plates 39 of the respective pair of shock absorbers 30 there are the control cables 45, and these connect with the forward respective bell-crank levers 46 and 47 which are operated by a lateral movement of the operating bar 48.

Thus when the bar 48 is moved laterally, the two revolvable plates 39 in their respective take-up spool houses will be partially revolved so that the heads 37 with their ears 38 will be in alignment with their respective slots 40 to permit the drag line and ribbon 32 on their take-up spools to pay out.

Referring now to Figs. 4, 5, and 6 and for the moment to Fig. 4, there may be seen a small shaft 49 extending parallel with the shaft 48 and mounted on this shaft is the control handle 50.

Also mounted at one end of the shaft 49 is the small crank arm 51 to which is connected the bar 52 and which bar in turn is connected with the small crank arm 53 mounted on the cross shaft 54.

The ends of this bar 54 are bent as at 55 to engage the respective hooks 56 which are fastened to the inner faces of the respective air drags 6.

Thus the pilot on a rearward movement of the control lever 50 will revolve the shaft 54 with its hooks 55 to thus release the oppositely positioned air drags 6.

The handle 50 is also mounted for a slight twisting movement so that the stub 57 and its link 58 will transmit a lateral movement to the operating bar 48 heretofore mentioned to revolve the plates 39 in the free spool housings 34 so that the drag lines 4 and the cable 32 may pay out from the take-up spools 31.

Mounted on the other end of the shaft 49 may be seen the ratchet wheel 59 with its dog 60 (Fig. 7) and over this ratchet wheel extends the link chain 61 which in turn passes over a similar wheel 62 mounted on the shaft 18 which shaft permits the simultaneous opening of the air drags.

Thus after the air brakes have been used and the airplane has landed, a forward and rearward movement of the operating handle 50 may, through the ratchets and chains heretofore mentioned, revolve the shaft 18 and move the air drags back to their original position so that they may be carefully housed in the fuselage.

Having described the several mechanical features, a brief description of the operation is set out.

*Operation*

Assuming that the air brakes 6 are housed within the fuselage as shown in Fig. 14, and the airplane is in flight; also assuming it is necessary to make a landing and it is desired to reduce the airplane's speed; the operator will pull the handle 50 inwardly which movement in turn will revolve the shaft 54 to thus unlock the air drags 6 and let them swing back to the first dotted line position shown in Fig. 1. At about this point the rollers R on the inner ends of the arms 8 and 9 of both air drags 6 will pass into their channels 22 and 23 (Fig. 11) of their respective sockets, at which time the fan-shaped air drags will be spread to their opened position as shown in Figs. 2, 3, and 8. The shock on the drag lines 4 will be taken up through the two shock absorbers 30.

After the airplane has lost its speed due to the resistance to the wind, the pilot will twist the handle 50 to thus laterally move the operating bar 48 which in turn will revolve the plates 39 in the housings 34 to permit the ears 38 on the heads 37 to register with the elongated slot 40 in the plate which then will permit the drag lines 4 to pay out as well as the cables 32 on the take-up spools 31. The fan-shaped air drags 6 will then tend to fold due to the wind stream and also due to the fact that the rollers R on the inner ends of the crossed arms 8 and 9 will now be guided in their respective channels towards the center point 25. Then the airplane will taxi to a stop.

The pilot may then work the handle 50 again to ratchet the shaft 49 to in turn revolve the spindles 12 so that the fans or air drags 6 in their collapsed condition may be placed back in the fuselage.

As heretofore mentioned, the fans do not have to be re-opened or spread when being returned to their original position as in this instance the rollers R will pass along the central channel 27 and into the channel 20 (Fig. 11) the crossed arms, therefore, never being spread on their return.

The air drags 6 have opened in unison due to the pinion and racks 16 and 17, so that the stability of the airplane will not be affected, and there is no possibility of one fan opening ahead of the other.

Also when the fans are in their collapsed condition and are again swung forwardly to be housed, the take-up spools 31 will wind up the ribbons or cables 32 and pull the drag lines back to the position shown in Fig. 15, the small ears 38 being pressed inwardly as the head 37 passes through the revolvable plate 39 in its housing 34.

From the foregoing it will be seen that I have provided a very flexible form of air brake which is to be used wherever it would be desired to slow down the speed of the airplane on landing. The brakes are quickly releasable as just above described and also may be allowed to swing rearwardly from their braking position by a simple twist of the wrist when the fan-shaped drags will then collapse or fold after which time the drags may be quickly returned to their position in the fuselage.

Finally, it will be understood that the operating mechanism is illustrative only of one manner in which these brakes may be operated and other forms of operating means might be used without departing from the spirit and scope of the invention.

Having thus described my invention, what I claim as new and desire to secure by Letters Patent is:

1. In an airplane, two foldable fanlike air drags secured to the opposite sides of the fuselage and respectively positioned so that a horizontal plane passing through the longitudinal axis of the fuselage coincides with a horizontal plane passing through the longitudinal axis of the fanlike air drags, the said air drags normally held in their folded condition within the fuselage, means for releasing the fanlike air drags, guiding means at the inner end of each of said fanlike air drags for causing said fanlike air drags to unfold as they swing rearwardly to a position substantially at right angles to the fuselage to thereby provide an air-flow resistance on the landing of the airplane.

2. In an airplane, two spreadable fanlike air drags pivotally secured to the opposite sides of the fuselage, the said air drags normally held in their non-spreadable condition within the fuselage and in a horizontal plane coinciding with a horizontal plane passing through the longitudinal axis of the fuselage, cables for limiting the outward movement of the drags secured to the outer end of said fanlike air drags and also secured at their opposite ends to the fuselage at points in a vertical plane passing substantially through the center of gravity of the plane, means for releasing the fanlike air drags so that they will swing when plane is in motion to a position at right angles to the fuselage, guiding means at the inner ends of each of said drags for causing the said drags to spread as they swing back and approach their right angular position to thereby provide an air-flow resistance on the landing of the plane.

3. In an airplane two spreadable fanlike air drags pivotally secured to the opposite sides of the fuselage and near the rear thereof, the said air drags normally folded against said fuselage and in their non-spread condition, cables for holding and limiting the movement of said drags secured to the outer ends of said fanlike air drags, shock absorbers secured to the fuselage and in a vertical plane passing substantially through the center of gravity of the plane, the said cables secured at their opposite ends to said shock absorbers, means for releasing the fanlike air drags so that they will swing to a position at right angles to the fuselage, and guiding means at the inner ends of each drag for causing the fanlike air drags to spread in unison during their swing and shortly before they approach their right angular position to thereby provide an air-flow resistance on a landing of the airplane.

4. In an airplane, two spreadable fanlike air drags, pivotally secured to the opposite sides of the fuselage and near the rear thereof, the said air drags normally lying against said fuselage in their non-spreadable condition, cables secured to the fuselage and to said air drags for holding and limiting the amount of rear movement of said air drags, means for releasing the said fanlike air drags, guiding means at the inner end of the air drags for causing the air drags to simultaneously spread as they swing back to a braking position at right angles to the fuselage, and means for extending the length of the cables whereby said air drags may swing to a position beyond their right angular braking position to thereby lessen the resistance of said air drags.

5. In an airplane two spreadable fanlike air drags pivotally secured at the opposite sides of the fuselage and near the rear thereof, each of said air drags comprising two arms crossed near their pivotal ends, a socket for each air drag for housing the crossed ends, and each socket provided with guiding channels in which the inner ends of said crossed arms travel, the walls of the said channels guiding the crossed arms as the fanlike air drag spreads when swinging to a braking position at right angles to the fuselage.

6. In an airplane two spreadable fanlike air drags pivotally secured at the opposite sides of the fuselage and near the rear thereof, said arms normally held in a folded position against the fuselage, each of said air drags comprising two arms and a covering extending between the arms, the said arms crossed near their pivotal ends, a substantially hemispherical socket for each air drag to house the said crossed ends, and each socket provided with internal guiding channels in which the inner ends of the said crossed arms travel, the walls of said channels spreading the crossed arms to thereby spread the fanlike air drag to a fully opened position as the drag swings to a braking position at right angles to the fuselage.

7. In an airplane two spreadlike fanlike air drags pivotally secured to the opposite sides of the fuselage and near the rear thereof, said arms normally held in a non-spread condition against the fuselage, means for releasing the same, each of said air drags comprising two arms and a covering extending between the same, the said arms crossed at their pivotal point, a substantially hemispherical socket for each air drag to house the said crossed ends, each socket provided with internal guiding channels in which the inner ends of said crossed arms travel, the walls of said channels guiding and spreading the crossed arms to thereby spread the fanlike air drag to a fully opened position as the said drag swings to a braking position at right angles to the fuselage and each socket provided with a further central guiding channel whereby the air drag may be swung to its normal position without spreading.

8. In an airplane two openable fanlike air drags pivotally secured to the opposite sides of the fuselage, each of said air drags comprising crossed arms and a covering extending between the same, additional elastic means positioned on the covering to normally hold the fanlike crossed arms in their closed position, and means secured to the fuselage and cooperating with the inner ends of the crossed arms to assist in guiding the fanlike air drag to its spread and folded positions.

9. In an air-drag mechanism for airplanes, a pivotally mounted and spreadable fanlike drag, a cable secured to the drag, a shock absorber, an additional housing secured to the shock absorber, a take-up spool in said housing, a second short pay-off cable on said take-up spool, a movable head in said housing, the first-mentioned cable secured to the outer end of said head and the second-mentioned cable secured to the inner end of said head, the first-mentioned cable permitting the air drag to swing to a braking position, and the pay-off cable permitting the air drag to swing to a position beyond its braking position.

10. In an air-drag mechanism for airplanes a pivotally mounted and spreadable fanlike air drag, a cable secured to the outer end of the air drag, a shock absorber, an additional housing secured to the shock absorber, a take-up spool in said housing, a second short pay-off cable on said take-up spool, a movable head in said housing, the first-mentioned cable also secured to the outer end of said head and the second-mentioned cable secured to the inner end of said head within the said housing, the first-mentioned cable permitting the air drag to swing to a braking position, manually controlled means for releasing the head from said housing whereby the additional length of the pay-off cable will permit the said air drag to swing to a position beyond its braking position.

11. In an air resistance braking mechanism for airplanes two fan-shaped normally collapsed housed air drags pivotally mounted and adapted to swing in unison to a plane at right angles to the wind stream, means for spreading the fans as they swing to such position, manually controlled means for permitting the fans to swing to a position beyond their right angular position, means for closing the fans as they swing to said last-mentioned position, and means for allowing the fans to be reswung to their housed position without re-spreading the fans.

ARTHUR DAVID HANSSON.